United States Patent [19]

Smith et al.

[11] Patent Number: 5,230,407
[45] Date of Patent: Jul. 27, 1993

[54] LINKAGE ROD WITH SHOCK ABSORBING

[75] Inventors: Gary T. Smith, Canyon County; William S. Jensen, Canoga Park; Edwin Banks, Lakeview Terrace; Andy Pork, Simi Valley; Michael R. Teeter, Canoga Park, all of Calif.

[73] Assignee: Applied Power Inc., Butler, Wis.

[21] Appl. No.: 887,267

[22] Filed: May 22, 1992

Related U.S. Application Data

[63] Continuation of Ser. No. 542,166, Jun. 22, 1990, abandoned.

[51] Int. Cl.$^5$ .............................................. F16F 1/44
[52] U.S. Cl. .................................. 188/281; 267/70; 267/147; 267/140.2
[58] Field of Search ............... 74/581, 582; 188/268, 188/281; 267/70-72, 135, 136, 140.11, 140.2, 147, 166, 175, 177, 195, 196

[56] References Cited

U.S. PATENT DOCUMENTS

| | | | |
|---|---|---|---|
| 2,488,730 | 11/1949 | Lake et al. | 74/582 X |
| 2,680,585 | 6/1954 | Crede | 267/140.11 |
| 2,687,269 | 8/1954 | Titus et al. | 267/140.11 |
| 2,687,270 | 8/1954 | Robinson | 248/565 |
| 2,869,858 | 1/1959 | Hartwell | 267/147 |
| 3,017,170 | 1/1962 | Westcott | 74/582 |
| 3,073,557 | 1/1963 | Davis | 267/147 X |
| 3,250,502 | 5/1966 | Robinson | 248/560 |
| 3,685,847 | 8/1972 | Smolka et al. | 267/177 X |
| 3,724,052 | 4/1973 | Graham et al. | 74/470 X |
| 4,074,896 | 2/1978 | Eftefield | 267/139 |
| 4,193,587 | 3/1980 | Cline | 267/177 X |

FOREIGN PATENT DOCUMENTS

| | | | |
|---|---|---|---|
| 121108 | 1/1972 | Denmark . | |
| 2406144 | 8/1975 | Fed. Rep. of Germany . | |
| 2923344 | 1/1980 | Fed. Rep. of Germany . | |
| 2262233 | 2/1974 | France . | |
| 136608 | 7/1960 | U.S.S.R. | 267/147 |
| 444914 | 3/1936 | United Kingdom | 74/581 |

*Primary Examiner*—Robert J. Oberleitner
*Assistant Examiner*—Alfred Muratori
*Attorney, Agent, or Firm*—Quarles & Brady

[57] ABSTRACT

A linkage rod for absorbing shocks and vibrations has a housing with a central bore. A spacer tube and a spacer load plate are inserted into the central bore. Several resilient members preferably formed of crimped metal wire strands are located in the central bore between the spacer load plate and a piston load plate. A mounting member has a shoulder formed between body and neck portions. A snubber cap having a central opening with an inwardly-directed wall is positioned around the mounting member. A snubber nut is attached to the mounting member to trap the inwardly-directed wall between the snubber nut and the shoulder. The snubber cap is fastened to the housing and the mounting member may move axially relative to the housing. The resilient members resist axial movement of the mounting member.

13 Claims, 3 Drawing Sheets

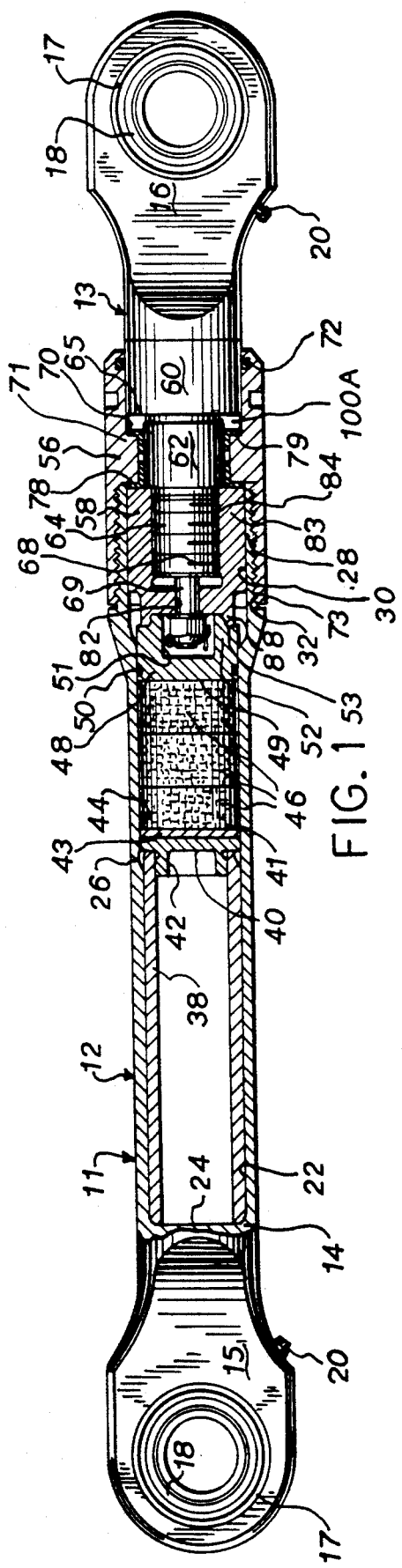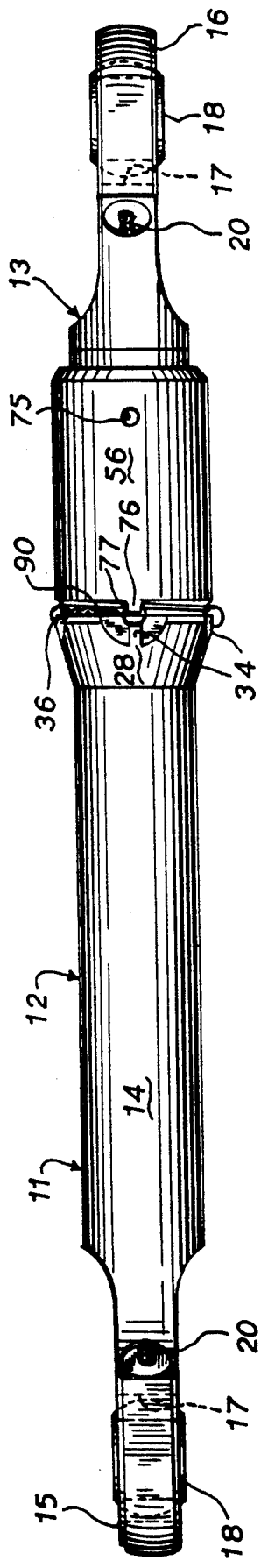

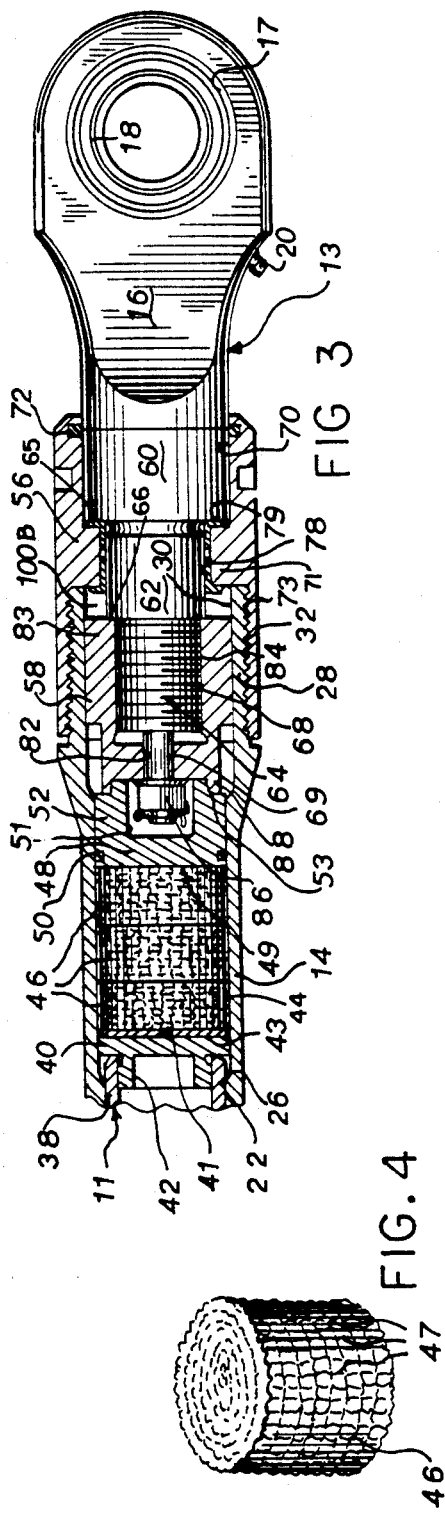
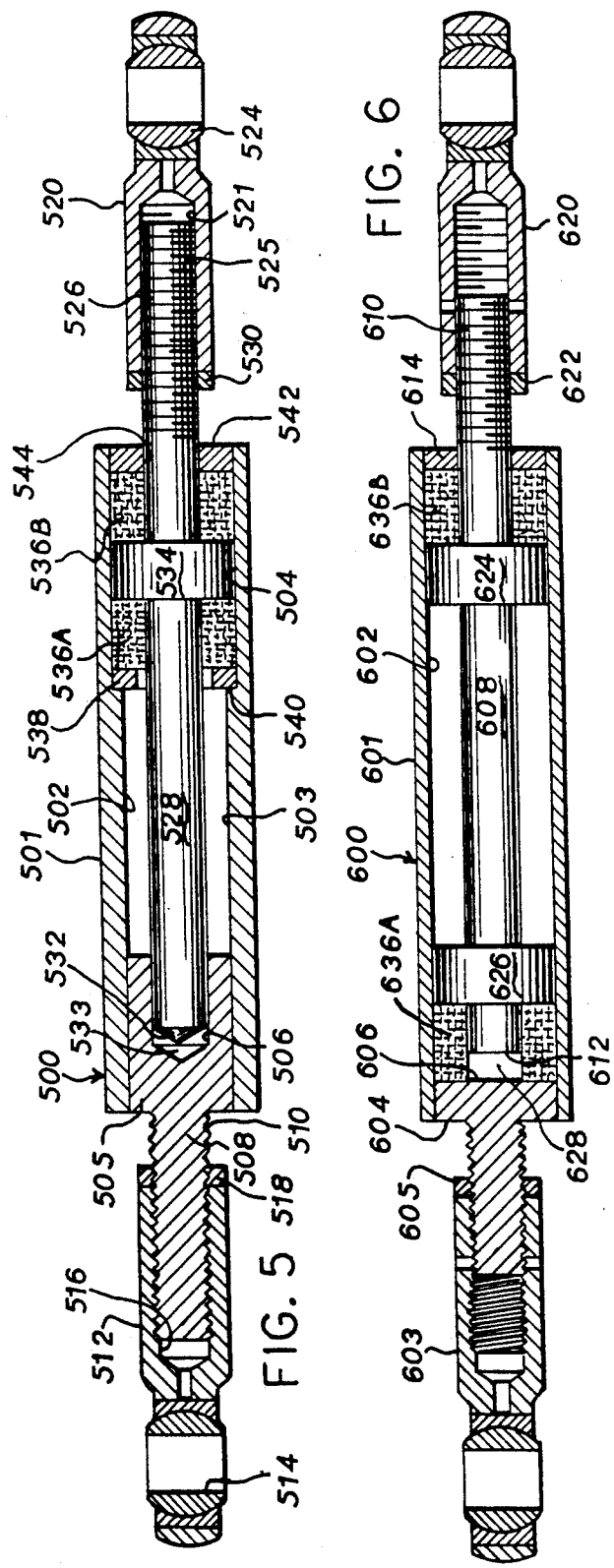

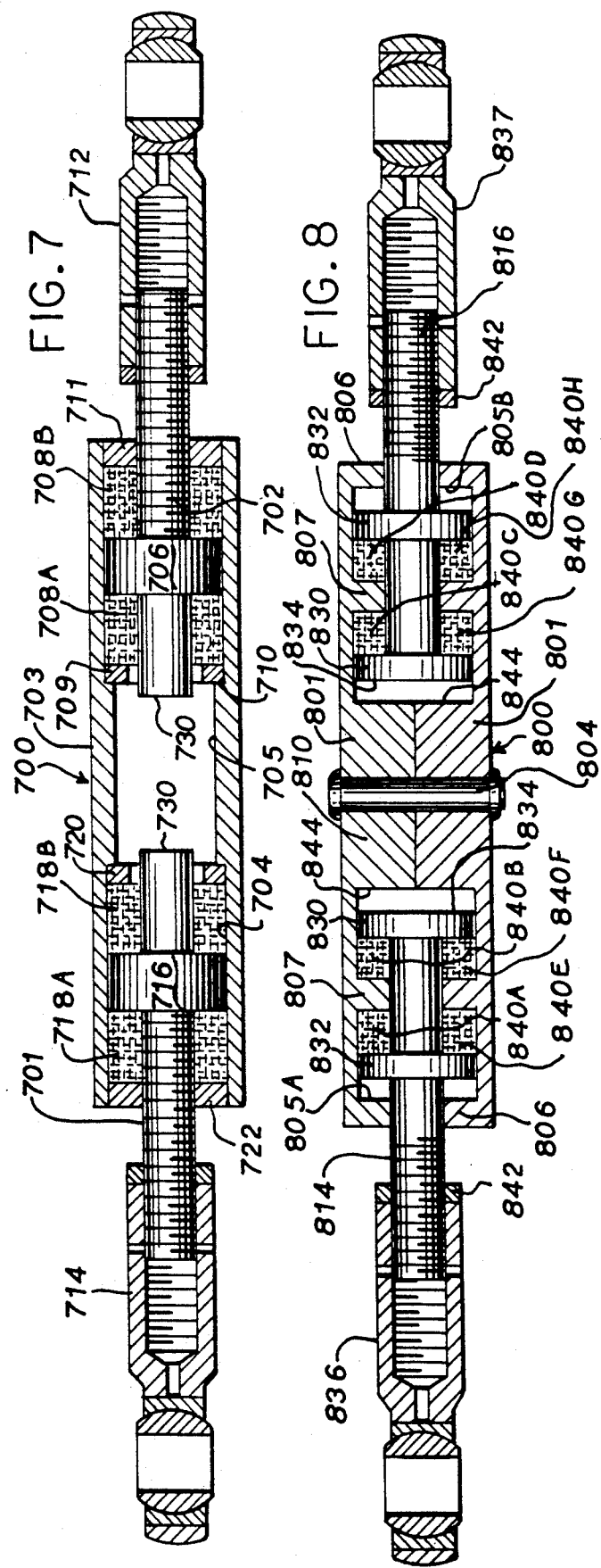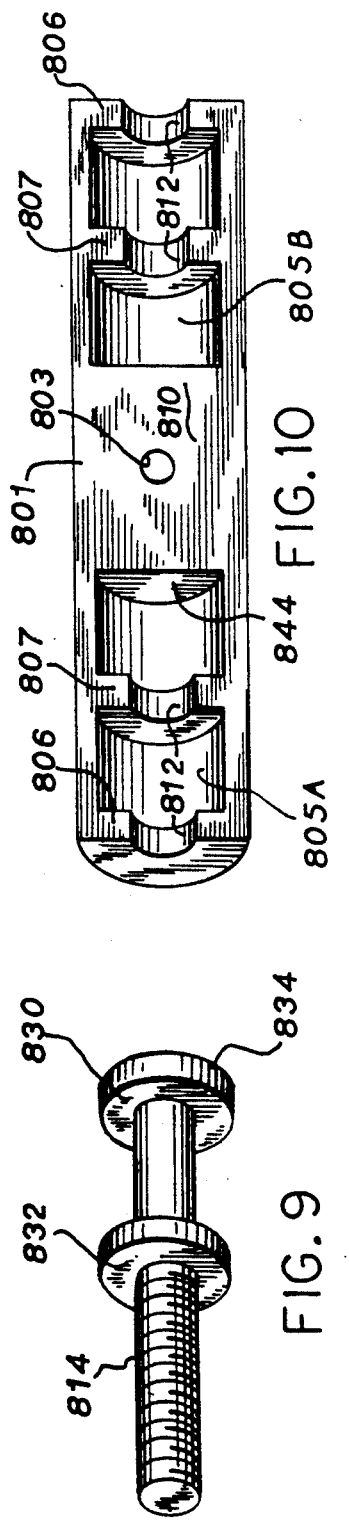

LINKAGE ROD WITH SHOCK ABSORBING

This is a continuation of application Ser. No. 07/542,166 filed Jun. 22, 1990, now abandoned.

BACKGROUND OF THE INVENTION

The present invention relates to a vibration and shock absorbing linkage rod. More particularly, it pertains to a linkage rod that attenuates undesirable shock and vibration loads between components of a mechanism, while altering the structural resonance of the mechanism. The linkage rod also reacts out extreme compression and tension loads through the housing of the linkage rod.

Linkage rods of the present type are used to connect components of mechanisms which are subject to shock and vibration loads causing both compression and tension. One particular application for this type of linkage rod is on aircraft landing gear. The landing gear is frequently subjected to short duration, high acceleration compressive impulses.

Presently, linkage rods incorporate solid connections between the ends of the linkage rod. These rods often do not provide adequate compliance between the connected points, resulting in excessive forces being transmitted through the rods. Additionally, the resultant stiffness may contribute to a system that has inadequate overall compliance and an inappropriately placed resonant frequency for the input impulses.

Thus, it can be seen that an improved linkage rod is needed to attenuate the undesirable shock and vibration loads which act on the components in certain systems.

SUMMARY OF THE INVENTION

This invention provides a linkage rod for absorbing shocks and vibrations. In addition, linkage rod itself is compliant to enable the adjustment of system resonant frequencies. This permits the selection of system vibration characteristics that best mitigate the imposed vibrations or shocks. In general, the linkage rod has an elongated cylinder with a central bore. The central bore is open at an open end of the cylinder. A resilient member is positioned in the central bore, and a snubber cap is secured to the cylinder adjacent the open end. The snubber cap has a central opening with an inwardly-directed wall. A piston assembly is slidably positioned in the central opening of the snubber cap. The piston assembly is capable of limited axial movement relative to the snubber cap and the cylinder. The movement is limited in both directions by contact with the inwardly-directed wall. Furthermore, movement in one direction causes compression of the resilient member. The linkage rod also includes means for mounting the linkage rod.

This aspect of the invention results in a linkage rod that incorporates a resilient member between the rod ends. The resilient member lessens the forces being transmitted through the linkage rod. Additionally, the resilient member provides the necessary means for adjusting the system resonant frequencies to handle dynamic shock and vibration loads.

In another aspect of the invention, the linkage rod includes a cylinder or housing having a closed end and an opposite open end. A central bore of the housing is open at the open end of the housing. Adjacent the closed end, the housing includes means for mounting the linkage rod. The linkage rod has at least one resilient member positioned in the central bore of the housing. A mounting member of the linkage rod has a body portion and an adjacent neck portion, with a shoulder formed between the body and neck portions. Adjacent the body portion, the mounting member includes means for mounting the linkage rod. A snubber nut is fastened to the mounting member such that the snubber nut is spaced apart from the shoulder. A snubber cap has a central opening with an inwardly-directed wall. The wall is trapped between the shoulder and the snubber nut, and the snubber cap is secured to the housing adjacent the open end. Thus, the mounting member is capable of limited axial movement relative to the snubber cap, and the movement causes compression of the resilient member.

This aspect of the invention also beneficially reduces the shock and vibration forces that are transmitted through the linkage rod. One component in the system is attached to the housing, while a second component is attached to the mounting member. The linkage rod allows relative movement between the mounting member and the housing, and thus between the attached components in the system. The movement causes compression of the resilient member. The resilient member resists compression and absorbs a portion of the energy being transmitted into the linkage rod by shock and vibration impulses. The linkage rod reduces the amount of stress at the load points and thereby reduces the amount of wear to the moving components of the linkage rod.

The resilient member is preferably fabricated from relatively fine strands of crimped wire that are compressed together into a cushion. As the resilient member is compressed, a greater portion of each strand contacts the neighboring strands. The resilient member thus provides non-linear resistance to compression of the resilient member itself, and of the linkage rod. The resilient member reduces the tendency of system components to resonate at or near undesirable impulse frequencies, thereby eliminating amplification of accelerations at these frequencies.

The amount of axial movement of the mounting member relative to the housing is limited by the inwardly-directed wall of the snubber cap. Compression of the linkage rod will eventually cause the shoulder of the mounting member to contact the inwardly-directed wall and stop further compression. After this point, additional compressive forces are transmitted through the mounting member, the snubber cap and the housing. Thus, the maximum amount of compression of the resilient member may be selected to prevent damage to the resilient member. Under tension loads, the snubber nut contacts the inwardly-directed wall. In this way, tension loads are transmitted directly through the housing, the snubber cap, the snubber nut and the mounting member.

In another aspect of the invention, the linkage rod also includes a spacer tube positioned in the central bore of the housing. The length of the spacer tube determines the amount of compression of the resilient member prior to mounting the linkage rod. By varying the preload condition of the resilient member, the threshold compressive force required to initiate compression of the linkage rod may be selected. This arrangement also allows modification of the response characteristics of the resilient member. The response characteristics may be chosen to prevent resonance of the mechanism components at or near undesirable impulse frequencies.

In another aspect, the linkage rod includes a pair of load plates positioned in the central bore on opposite sides of the resilient member. This aspect addresses a problem associated with present linkage rods by creating a large bearing area for the resilient member.

In another aspect, the linkage rod has a housing with a first end, a second end a central bore. A bushing cap is attached to the housing adjacent the first end. A finger of the bushing cap is located outside the central bore to allow for mounting of the linkage rod. A shaft has a snubbing end, an opposite projecting end and a radially-extending load ring between the snubbing and projecting ends. The load ring is slidably mounted in the central bore, while the projecting end of the shaft extends outside the central bore. The projecting end of the shaft is designed to allow mounting of the linkage rod. The linkage rod includes at least one resilient member positioned in the central bore against the load ring. As a result, axial movement of the shaft relative to the housing causes compression of a resilient member. In this aspect, the load ring of the shaft is positioned against the resilient member and the resilient member provides resistance to shaft movement. The resilient member thereby reduces the compression or tension forces transmitted through the linkage rod and reduces the tendency of the mechanism components to resonate at or near the impulse frequency.

In another aspect, the bushing cap has a central cavity and the snubbing end of the shaft is slidably positioned in the central cavity. This aspect assists in slidably mounting the shaft within the housing, and also results in large compressive forces being reacted out through the housing. When a compressive load is applied to the linkage rod, the load ring compresses a resilient member and the snubbing end of the shaft moves further into the central cavity. After a particular amount of force is reached, however, the snubbing end of the shaft abuts the bushing cap to prevent further compressive movement of the shaft. Additional compressive force is thereafter transmitted through the shaft and the housing without further compression of the resilient member.

In another aspect, a load washer is mounted in the central bore and a first resilient member is positioned between the load ring and the load washer. A washer cap is secured to the second end of the housing and a second resilient member is positioned between the load ring and washer cap. In this aspect, resilient members are positioned on opposite sides of the load ring to resist both compression and extension of the linkage rod.

In another aspect of the invention, a linkage rod includes a housing having a first end, a second end and a central bore. A first shaft member has a snubbing end, an opposite projecting end and a radially-extending first load ring located between the snubbing and projecting ends. The first load ring is slidably mounted in the central bore, and the projecting end extends outside the first end of the housing. A second shaft member likewise has a snubbing end, an opposite projecting end and a radially-extending second load ring located between the snubbing and projecting ends. The second load ring is slidably mounted in the central bore, and the projecting end of the second shaft member extends outside the second end of the housing. The projecting ends of the first and second shaft members are designed to provide for mounting of the linkage rod. A first resilient member is positioned in the central bore between the first load ring and a first retainer. Axial movement of the first shaft member in one direction relative to the housing causes compression of the first resilient member. Similarly, a second resilient member is positioned in the central bore between the second load ring and a second retainer. Axial movement of the second shaft member in one direction relative to the housing causes compression of the second resilient member. This aspect provides a linkage rod having two independent movable shaft members. Movement of the shaft members toward one another (i.e., compression of the linkage rod) is resisted by the resilient members.

In another aspect, the linkage rod includes first and second washer caps secured to the ends of the housing. The washer caps have central openings for the shaft members to pass therethrough. A third resilient member is positioned in the central bore between the first washer cap and the first load ring. Axial movement of the first shaft member in an opposite direction relative to the housing causes compression of the third resilient member. A fourth resilient member is positioned in the central bore between the second washer cap and the second load ring. Axial movement of the second shaft member in an opposite direction relative to the housing causes compression of the fourth resilient member. This aspect results in the separate shaft members encountering resistance to movement during both compression and extension of the linkage rod.

Thus, it is an object of the present invention to provide a linkage rod that absorbs compression and tension shock and vibration loads applied to the linkage rod.

It is another object of the invention to provide a linkage rod with a resilient member that acts against a relatively large bearing surface.

It is another object of the invention to provide a linkage rod that reduces the tendency of mechanism components to resonate at or near the compression or tension impulse frequency.

It is yet another object of the invention to provide a linkage rod that is capable of reacting out high compression and tension forces through the linkage rod housing, rather than through resilient members of the linkage rod.

It is another object of the invention to provide a linkage rod which provides non-linear resistance to both compression and extension.

It is still another object of the invention to provide a linkage rod having resilient members where the preload compression and the response characteristics of the resilient members may be modified.

The foregoing and other objects and advantages of the present invention will appear from the following description. In the description, reference will be made to the accompanying drawings which illustrate preferred embodiments of the present invention. Such embodiments do not represent the full scope of the invention. Reference should therefore be made to the claims herein for interpreting the full scope of the invention.

BRIEF DESCRIPTION OF THE DRAWINGS

FIG. 1 is a top view of a linkage rod according to the present invention, with portions broken away and portions shown in section for the purposes of illustration;

FIG. 2 is a side view of the linkage rod shown in FIG. 1;

FIG. 3 is an enlarged top view of a portion of the linkage rod shown in FIG. 1, with portions shown in section for the purposes of illustration, and with the linkage rod being depicted in a fully compressed position;

FIG. 4 is a perspective view of a resilient member of the linkage rod shown in FIGS. 1-3;

FIG. 5 is a side view with portions shown in section of a second embodiment of the linkage rod shown in FIGS. 1-3;

FIG. 6 is a side view with portions shown in section of a third embodiment of the linkage rod shown in FIGS. 1-3;

FIG. 7 is a side view with portions shown in section of a fourth embodiment of the linkage rod shown in FIGS. 1-3;

FIG. 8 is a side view with portions shown in section of a fifth embodiment of the linkage rod shown in FIGS. 1-3;

FIG. 9 is a perspective view of a shaft member that is used in the linkage rod of FIG. 8; and p FIG. 10 is a perspective view of a shell which is used in the linkage rod of FIG. 8.

DETAILED DESCRIPTION OF THE PREFERRED EMBODIMENTS

Referring to FIGS. 1 and 2, a shock and vibration absorbing linkage rod 11 according to the invention is comprised of a housing assembly 12, a snubber cap 56 and piston assembly 13. The housing assembly 12 includes a cylinder or housing 14 with an integral mounting portion 15. The piston assembly 13 has a similar mounting member 16. Both the mounting portion 15 and the mounting member 16 have apertures 17 that house spherical bearings 18. Lubrication fittings 20 in the mounting portion 15 and the mounting member 16 supply lubrication to the spherical bearings 18, which define the load points for the linkage rod 11. The linkage rod 11 is designed to be mounted between components of a mechanism which receives compression and tension shock and vibration loads, such as aircraft landing gear.

The elongated housing 14 has a cylindrical central bore 22 that terminates in an end wall 24. The central bore 22 has several different internal diameters due to a taper 26 and an expanded portion 28 of the housing 14. The central bore 22 includes an intermediate bore portion 44 formed between the taper 26 and the expanded portion 28 and a widened bore portion 30 formed in the expanded portion 28. The central bore 22 could alternatively be formed with a uniform inside diameter, if corresponding changes were made to the linkage rod components which reside in the central bore. The central bore 22 is open adjacent the expanded portion 28, which includes external threads 32. Adjacent the threads 32, the exterior of the housing 14 excludes a series of ridges 34 (FIG. 2) with holes 36.

The housing assembly 12 is constructed by inserting a number of components into the central bore 22 of the housing 14. First, a hollow spacer tube 38, formed of a high-strength material, is positioned in the central bore 22 against the end wall 24. The length of the spacer tube 38 may vary, as discussed more fully below, but is preferably not less than the distance between the end wall 24 and the taper 26.

Next, a spacer load plate 40, also formed of a high-strength material, is positioned in the central bore 22 against the spacer tube 38. The spacer load plate 40 has a main surface or face 41 and an opposite projecting ring 42. The ring 42 inserts into the center of the hollow spacer tube 38 to maintain the spacer load plate 40 against the spacer tube. The spacer load plate 40 is sized to fit within the intermediate bore portion 44 of the central bore 22.

As shown in FIGS. 1, 3, and 4, the housing assembly 12 also excludes several resilient members 46. The resilient members 46 are preferably fabricated from relatively fine strands of wire, shown generally as reference numeral 47 (FIG. 4). The strands 47 are preferably a high-strength corrosion resistant wire, such as stainless steel wire. The resilient members 46 are formed by compressing and shearing the wire strands 47 into cylindrical bundles or cushions. The individual strands 47 are crimped with closely spaced lateral curves to produce a generally undulating shape. When the strands 47 are compressed into a bundle, numerous portions of each strand contact the neighboring strands. Additional compression of the resilient member 46 causes a greater portion of each strand 47 to be in contact with the neighboring strands.

The disc-shaped resilient members are sized to fit within the-intermediate bore portion 44 of the central bore 22. Three resilient members 46 (the number may vary as described below) are placed adjacent one another in the intermediate bore 44, against the face 41 of the spacer load plate 40 (or against shim 43 as discussed below). The resilient members 46 are placed in the central bore 22 so that the strands 47 generally align with the longitudinal axis of the housing 14. Other types of resilient members, such as heavy springs or elastomeric materials, may be substituted in some applications for the metal wire resilient members 46.

A piston load plate 48 is next inserted into the central bore 22 so that a face 49 of the load plate 48 is positioned against the resilient members 46. The piston load plate 48 is formed of a high-strength material and sized to fit in the intermediate bore portion 44 of the central bore 22. A back-up ring 50 fits within a groove in the piston load plate 48 to seal against the inside wall of the central bore 22. The back-up ring 50, which may be formed of a plastic material in two split-ring portions, prevents migration of any wire fragments that may result from deterioration of the resilient members 46. The piston load plate 48 is also formed with a rim 52 that defines a chamber 51 and terminates in an outer ledge 53. When the piston load plate 48 is inserted into the central bore 22, the rim 52 extends toward the open end of the housing 14.

To aid in assembly of the linkage rod 11, a thin disc-shaped shim 43 may be positioned in the central bore 22 between the spacer load plate 40 and a resilient member 46. The shim 43 is useful to compensate for variations in the length of components of the linkage rod 11 (i.e., the housing 14, spacer tube 38, spacer load plate 40, piston load plate 48, etc.). The shim 43 may be removed, or additional shims added, to negate the effect of the stack up of manufacturing tolerances. By using shims 43, the desired amount of compression of the resilient members 46, and thus the desired distance between the spherical bearings 18, may be established for a given load on the linkage rod 11. This completes the construction of the housing assembly 12.

As shown most clearly in FIG. 3, the piston assembly 13 includes the mounting member 16 and a snubber nut 58. The piston assembly 13 is slidable relative to the snubber cap 56. Extending away from the aperture 17 for the spherical bearing 18, the mounting member 16 has a body portion 60, a neck portion 62 and a head portion 64. An annular shoulder 65 is formed between the body portion 60 and the neck portion 62. Similarly, a nut engagement surface 66 (FIG. 3) is formed between the neck portion 62 and the smaller head portion 64. The head portion 64 has external threads 68 and a longitudinal-extending projection 69, which also has external threads (not shown).

The snubber cap 56 is generally cylindrical with a central opening 70 having an inwardly-directed annular wall 71. On one side of the inwardly-directed wall 71, the snubber cap 56 has internal threads 73 that are adapted to mate with the external threads 32 of the housing 14. The snubber cap 56 can thereby be fixed relative to the housing 14. The central opening 70 is sized to slidably receive the body portion 60 of the mounting member 16. The snubber cap 56 includes a groove for a scraper seal 72, which seals between the snubber cap and the mounting member 16 to prevent contaminants from entering the linkage rod 11. The outside of the snubber cap 56 (see FIG. 2) has several wrench holes 75 and a number of ridges 76 with holes 77 therethrough.

When the snubber cap 56 is positioned around the body portion 60 of the mounting member 16, the inwardly-directed wall 71 radially surrounds the neck portion 62 of the mounting member 16. The smaller head portion 64 and projection 69 pass through the inwardly-directed wall 71 of the snubber cap when positioning the snubber cap 56 on the mounting member 16. A pair of snubber bushings 78 and 79, formed of bronze or other high strength non-metal material, are press fitted, epoxied and/or otherwise suitably fastened to the snubber cap 56. Each snubber bushing 78 and 79 has an axially-extending flange that is positioned between the neck portion 62 and the inwardly-directed wall 71. The snubber bushings 78 and 79 decrease wear of the piston assembly 13 and the snubber cap 56. The bushings 78 and 79 also reduce noise which would result if the snubber nut 58 and the mounting member 16 (both of which may be made of metal) were allowed to directly contact the inwardly-directed wall 71 (which may also be made of metal).

The snubber nut 58 has a central aperture 82 and a ring portion 83. The ring portion 83 is sized to fit in the widened bore portion 30 of the housing 14. The ring portion 83 has internal threads, located at reference numeral 84, that are adapted to mate with the external threads 68 of the head portion 64. When the threads 68 and 84 are engaged, the projection 69 of the mounting member 16 extends through the central aperture 82 of the snubber nut 58. The head portion 64 will threadably insert into the ring portion 83 until the ring portion contacts the nut engagement surface 66. A washer, nut and cotter pin arrangement 86 (FIG. 3) attaches to the threaded projection 69 to lock the snubber nut 58 in place relative to the head portion 64. The snubber nut 58 also includes an axially-extending lip 88 (FIG. 3).

Assembly of the linkage rod 11 is completed by securing the snubber cap 56 to the housing assembly 12. A wrench is inserted into wrench holes 75 (FIG. 2) to rotatably engage the internal threads 73 of the snubber cap 56 with the external threads 32 of the housing 14. As the snubber cap 56 is threaded onto the housing 14, the snubber nut 58 slides into the widened bore 30 of the housing. The lip 88 of the snubber nut 58 securely contacts the ledge 53 of the piston load plate 48. The washer, nut and cotter pin arrangement 86 on the projection 69 fit within the chamber 51 of the piston load plate 48. The snubber cap 56 is threaded onto the housing 14 until the end of the housing 14 (adjacent external threads 32) contacts the inwardly-directed wall 71. This assembly preferably results in some preload compression of the resilient members 46. A locking safety chain 90 (FIG. 2) is strung between the holes 36 in the housing 14 and the holes 77 in the snubber cap 56 to lock the snubber cap 56 in place and prevent the threads 73 and 32 from backing out.

In the linkage rod 11 shown in FIGS. 1-3, the piston assembly 13 can move longitudinally a limited distance relative to the housing 14. Thus, the linkage rod 11 can move between an extended position (FIGS. 1 and 2) and a compressed position (FIG. 3) in response to various loads applied at the spherical bearings 18. In the preferred mode of operation, the linkage rod 11 is mounted with a static compressive load so that the linkage rod is normally in an intermediate position between the extended and compressed positions. From this intermediate position, dynamic compression and tension shocks and vibrations cause the linkage rod 11 to oscillate about the intermediate position.

The linkage rod 11 is capable of compressing from the extended position in part because the piston assembly 13 (mounting member 16 and snubber nut 58) can move relative to the snubber cap 56. The distance between the snubber nut 58 and the shoulder 65 is greater than the combined width of the inwardly-directed wall 71 and the snubber bushings 78 and 79. In the extended position (FIG. 1), the ring portion 83 of the snubber nut 58 is pressed by the preload of the resilient members 46 (and by any external tension force) into contact with the snubber bushing 78. This forms a gap 100A between the opposite snubber bushing 79 and the shoulder 65.

When the linkage rod 11 is mounted under a static compressive load, such as with aircraft landing gear, the piston assembly 13 slides relative to the housing 14 so that the distance between the spherical bearing 18 is reduced. This reduces the size of gap 100A. Concurrently, the snubber nut 58 and the piston load plate 48 slide further into the central bore 22 of the housing. The resilient members 46 normally compress due to the compressive load, and provide increasing resistance to establish the intermediate position of the linkage rod. The position of the linkage rod 11 upon mounting will depend on the intensity of the static compressive load, the preload of the resilient members 46, and the compression characteristics of the resilient members.

When a dynamic compression or tension shock impulse is applied to the linkage rod 11, the rod tends to oscillate about the intermediate position. Compressive shocks cause the mounting member 16, snubber nut 58 and piston load plate 48 to slide further into the central bore 22. This compresses the resilient members 46 from their intermediate position, but the resilient members 46 resist compression in a non-linear manner. As the resilient members 46 are compressed, more of the individual wire strands 47 are in contact so that resistance to further compression is enhanced. The resilient members 46 advantageously absorb energy being transmitted into the linkage rod 11 by the compressive impulse, and release the energy over a longer period of time. In this way, the resilient members 46 reduce the tendency of the attached structures to resonate at or near the impulse frequency. Additionally, the resilient members 46 reduce the maximum force at the load points and in the linkage rod 11.

Tension shocks detract from the static compression load on the linkage rod 11. Under the influence of a tension shock or vibration, the resilient members 46 will rebound and the linkage rod 11 will approach the extended position (FIG. 1). When the tension load is reduced, the static compression load causes the linkage rod 11 to once again approach the intermediate mounting position, i.e., somewhere between the fully extended and compressed positions. Overall, the linkage rod 11 attenuates the undesirable shock or vibration loads and alters the structural resonances of the connected mechanisms.

The linkage rod 11 is designed to react out compressive loads which exceed the desired compression range for the resilient members 46. As a compressive load increases, the shoulder 65 of the mounting member 16 moves closer to the snubber bushing 79. The resilient members 46 provide an increasing amount of resistance to the compression until the shoulder 65 contacts the snubber bushing 79. In this fully compressed position of the linkage rod 11, a gap 100B (FIG. 3), which is equal in size to gap 100A, is formed between the snubber nut 58 and snubber bushing 78. At this point, additional compressive loads bypass the resilient members 46 and are transmitted between the connected structures through the mounting member 16, the snubber cap 56 and the housing 14. The resilient members 46 will return the linkage rod 11 to the intermediate position (allowing for some oscillation) when the compressive load is reduced.

The linkage rod 11 is also designed to react out extreme tension loads. As a dynamic tension load increases in magnitude, the spherical bearings 18 move further apart in opposition to the static compressive load caused by mounting the linkage rod 11. The snubber nut 58 consequently moves closer to the snubber bushing 78. For sufficiently large tension loads, the snubber nut 58 contacts the snubber bushing 78 to place the linkage rod 11 in the extended position (FIG. 1). Additional tension loads are reacted out directly through the housing 14, snubber cap 56 snubber nut 58 and mounting member 16. When the tension load is reduced, the static compressive load returns the linkage rod 11 to the intermediate position (allowing for some oscillation).

The stiffness of the resilient members 46 may be altered by modifying the length of the spacer tube 38. Using a longer spacer tube (not shown) applies greater preload compression to the resilient members 46. With a longer spacer tube, the initial force required to begin compression of the linkage rod 11 is greater, compared to the force required when using a shorter spacer tube. Conversely, the preload compression of the resilient members 46 may be reduced by shortening the spacer tube 38.

In addition to changing the threshold level of force required to initiate compression of the linkage rod 11, modifying the stiffness of the resilient members changes the effective rebound characteristics of the resilient members 46 and thus the linkage rod 11. The response characteristics of the linkage rod 11 may be selected so that the attached structures will not resonate at or near the impulse frequency. The stiffness of the linkage rod 11 may also be altered by incorporating resilient members with modified compression characteristics. Further modification of the linkage rod 11 performance is possible by altering the number of resilient members 46. In any case, use of the spacer load plate 40 and the piston load plate 48 on opposite sides of the resilient members 46 beneficially provides large bearing surfaces for the resilient members 46.

An alternate embodiment of the invention is illustrated by linkage rod 500 of FIG. 5. A tubular housing 501 is formed with the central bore 502 that has a narrow portion 503 and an enlarged portion 504. A bushing cap 505 is welded or otherwise suitably fastened within the narrow portion 503 of the central bore 502. The bushing cap 505 has a central cavity 506 and a finger 508 projecting outside the housing 501. The finger 508 has external threads 510 for attaching a first mounting member 512. The first mounting member 512 includes a spherical bearing 514 and a threaded central opening 516. A jam nut 518 is threadably mounted on the external threads 510 of the finger 508 to lock the first mounting member 512 in position relative to the finger 508.

Similarly, a second mounting member 520 has a threaded central opening 521 and a spherical bearing 524 for mounting the linkage rod 500. The second mounting member 520 is rotatably attached to external threads 525 of a projecting end 526 of a shaft 528. A jam nut 530 is mounted on the projecting end 526 to lock the second mounting member 520 in position relative to the shaft 528.

The shaft 528 is slidably mounted within the housing 501 of the linkage rod 500. Opposite the projecting end 526, a snubbing end 532 of the shaft 528 is slidably received within the cavity 506 of the bushing cap 505. A gap 533 is formed between the snubbing end 532 and the bushing cap 505. The shaft 528 includes a radially-extending load ring 534 that slides within the enlarged portion 504 of the central bore 502.

A pair of resilient members 536A and 536B are mounted on the shaft 528 in the enlarged portion 504 of the central bore 502. The resilient members 536A and 536B are preferably formed in the same manner as resilient members 46 (FIGS. 1-4), although shaped into an annulus rather than a cylinder. Other resistive devices, such as springs or elastomeric material, could be employed instead of the wire strand resilient members. One resilient member 536A is positioned between the load ring 534 and a load washer 538. The load washer 538 has an outside diameter sized to fit within the enlarged portion 504 and is positioned against a step 540 formed between the enlarged portion 504 and the narrow portion 503.

A second resilient member 536B is mounted around the shaft 528 on the opposite side of the load ring 534. This resilient member 536B is maintained within the enlarged portion 504 of the central bore 502 by a washer cap 542. The washer cap 542 has a central opening 544 and an outside diameter sized to fit within the enlarged portion 504 of the housing 501. The washer cap 542 is welded or otherwise suitably fastened to the housing 501 with the shaft 528 projecting through the central opening 544. The resilient members 536A and 536B are preferably loaded so that they will remain at least partially compressed through the full movement of the shaft 528.

In operation, the linkage rod 500 is mounted between two structures using the spherical bearings 514 and 524. The operating length of the linkage rod 500 may be controlled by changing the amount that the finger 508 is inserted into the first mounting member 512 and the amount that the projecting end 526 is inserted into the second mounting member 520.

As a compressive impulse is generated at the mounting members 512 and 520, the shaft 528 tends to move further into the central bore 502 of the housing 501. Movement of shaft 528 compresses resilient member 536A between the load ring 534 and the load washer 538. The resilient member 536A provides non-linear resistance to compression of the linkage rod 500, and the energy absorbed by the resilient member 536A is released over a longer period of time. For tension impulses, the linkage rod 500 functions in a similar manner, with resilient member 536B providing non-liner resistance to extension. The resilient members 536A and B consequently lower the maximum forces at the load points and in the linkage rod 500, thereby reducing stress in the mounting members 512 and 520 and reducing wear of the moving components.

For compressive forces exceeding the desired compression range of the resilient member 536A, the linkage rod 500 is designed to translate these forces between the attached structures through the mounting members 512 and 520, the bushing cap 505 and the shaft 528. As the linkage rod 500 is compressed, the snubbing end 532 of the shaft 528 slides further into the cavity 506 of the bushing cap 505, thus decreasing the size of gap 533. When the snubbing end 532 contacts the bushing cap 505, additional compressive force will be transmitted through the linkage rod 500 without further compression of the resilient member 536A.

As the compressive force is reduced, the resilient member 536A will tend to rebound to its original position, where the load ring 534 is centered between the washer cap 542 and the load washer 538. Note that even when resilient member 536A is fully compressed, resilient member 536B may exert a force tending to move the load ring 534 toward the load washer 538. Nonetheless, the net force of both resilient members 536A and 536B tends to move the load ring 534 toward a centered position between the load washer 538 and the washer cap 542. Oscillation of the shaft 528 past the centered position will be resisted by resilient member 536B. Extension of the linkage rod 500 is thus resisted in a non-linear manner due to compression of the resilient member 536B.

Another embodiment of the invention is illustrated by the linkage rod 600 of FIG. 6. A tubular housing 601 of the linkage rod 600 has a uniform central bore 602. A first mounting member 603 is rotatably attached to a bushing cap 604 and secured by a jamb nut 605. The bushing cap 604 is welded or otherwise suitably fastened to the housing 601 so that a face 606 of the bushing cap is located in central bore 602 of the housing 601.

A shaft 608 has a threaded projecting end 610 and an opposite snubbing end 612. The shaft 608 is positioned in the housing 601 with the projecting end 610 passing through a washer cap 614 that is attached to the housing. A second mounting member 620 is threadably attached to the projecting end 610 and secured by a jamb nut 622. The shaft 608 includes a first and second load rings 624 and 626, which are sized to slidably fit within the central bore 602 of the housing 601.

Before attaching the washer cap 614 to the housing 601 or the second mounting member 620 to the shaft 608, a pair of annular resilient members 636A and 636B are mounted around the shaft. One resilient member 636A is mounted on the snubbing end 612 and thereby forms an initial gap 628 between the snubbing end 612 and the face 606 of the bushing cap 604. The resilient member 636A provides non-linear resistance to compression of the linkage rod 600. The distance between the snubbing end 612 and the face 606 can be established so that the shaft 608 contacts the bushing cap 604 when the compression exceeds that desired for the resilient member 636A.

A second resilient member 636B is mounted on the shaft 608 between the first load ring 624 and the washer cap 614. This resilient member 5636B will resist extension of the linkage rod 600 due to tension loads. The resilient members 636A and 636B tend to dampen oscillations caused by compression or tension impulses.

The embodiment of the invention represented by linkage rod 700 in FIG. 7 incudes a pair of shaft member 701 and 702 which are mounted within a tubular housing 703. The housing 703 has a central bore 704 that includes a narrow middle portion 705. A load ring 706 of shaft member 702 is sized to slidably fit in the central bore 704. The load ring 706 is surrounded by annular-shaped resilient members 708A and 708B. One resilient member 708A is trapped between the load ring 706 and a load washer 709 that is pressed against a shoulder 710 formed adjacent the narrow portion 705 of the housing 703. The other resilient member 708B is maintained against the load ring 706 due to a washer cap 711. Shaft member 702 extends through a central opening of the washer cap 711 and threadably engages a mounting member 712.

The other side of the linkage rod 700 is formed identically with a mounting member 714 threadably attached to the shaft member 701. A load ring 716 of the shaft member 701 is located between a pair of annular resilient members 718A and 718B. The resilient members 718A and 718B are maintained between a load washer 720 and a washer cap 722.

Compressive forces applied to this linkage rod 700 are resisted by resilient members 708A and 718B. A short duration, high acceleration impulse at the load points causes the shaft members 701 and 702 to move toward one another. Resilient member 708A will be compressed between the load ring 706 and the load washer 709, and resilient member 718B will be compressed between the load ring 716 and the load washer 720. Both resilient members 708A and 718B provide non-linear resistance, and release energy absorbed from the impulse over a longer period of time.

Although not shown in FIG. 7, the shaft members 701 and 702 could be somewhat longer so that opposing faces 730 of the shaft members would be spaced apart by only a small gap. The gap could be sized so that the shaft members 701 and 702 contact one another when the compressive force on the linkage rod 700 reaches the desired maximum compression range of the resilient members 708A and 718B. This would result in a snubbing effect that would translate excessive compression forces through the shaft members 701 and 702 and mounting members 712 and 714, rather than through the resilient members 308A and 318B.

Upon reduction of the compression force, resilient members 708A and 718B tend to move the load rings 706 and 716 back to their original, centered positions. Resilient members 708B and 718A provide non-linear resistance to extension of the linkage rod 700, thereby reducing the tendency of the linkage rod to oscillate in response to compressive shocks and vibrations. These resilient members 708B and 718A similarly resist tension loads applied to the linkage rod 700.

A further embodiment of the invention is illustrated by linkage rod 800 in FIG. 8. The linkage rod 800 is formed by two identical shells 801 (FIGS. 8 and 10) that are connected by inserting a fastener 804 through attachment holes 803. The shells 801 mate to form first and second chambers 805A and 805B. Each shell 801 is formed with cap portions 806, inwardly-directed wall portions 807 and a center portion 810. The walls 807 are located near the middle of each chamber 805A and 805B. The cap portions 806 and the walls 807 are formed with recesses 812 (FIG. 10) so that shaft members 814 and 816 may be mounted between the shells 801 in the chambers 805A and 805B.

The shaft members 814 and 816 (FIGS. 8 and 9) are identically formed with inner and outer load rings 830 and 832. The inner load ring 830 is formed adjacent a snubbing end of the shaft member 814 to thereby form a face 834. Mounting members 836 and 837 are threadably attached to the shaft members 814 and 816, respectively. The linkage rod 800 also includes a plurality of resilient members 840A-H formed in a half-ring shape of compressed wire strands, similar to resilient members 46 of FIGS. 1-4.

The linkage rod 800 is assembled by positioning the resilient members 840A-H around the shaft members 814 and 816 between the inner and outer load rings 830 and 832. The shaft members 814 and 816 are mounted in one of the shells 801 so that the resilient members 840A-H surround each wall 807. The half shells 801 of the linkage rod 800 are then brought together and secured through the attachment hole 803 by the fastener 804. Jam nuts 842 are used to attach and lock the mounting members 836 and 837 on the ends of the shaft members 814 and 816.

When a compressive force is applied to the linkage rod 800, the resilient members 840A, 840D, 840E and 840H compress and provide increasing resistance to further compression of the linkage rod. High compressive forces cause the faces 834 of the shaft members 814 and 816 to contact snubbing surfaces 844 of the shells 801. Additional compressive force applied to the linkage rod 800 will then be transmitted through the linkage rod without further deformation of the resilient members 840A, 840D, 840E and 840H. The size of gaps between the faces 834 and the snubbing surfaces 844 may be modified to control the amount of compressive force required for the shaft members 814 and 816 to contact the shells 801. The other resilient members 840B, 840C, 840F and 840G resist extension of the linkage rod 800 when the compression force has terminated, or when a tension load is applied to the linkage rod 800.

The foregoing detailed description has been for the purpose of illustration. Thus, a number of modifications and changes may be made without departing from the spirit and scope of the present invention. For example, the bores of the housings could be formed with different internal contours to eliminate the need for items such as the load washers, spacers tubes and spacer load plates. Likewise, various components, such as the spacer tube 38 and the spacer load plate 40, could be combined into a single component, or formed integrally with the housing. Therefore, the invention should not be limited by the specific embodiments described, but only by the claims.

We claim:

1. A linkage rod for absorbing shocks and vibrations, comprising:
   an elongated cylinder having a central bore open at an open end of the cylinder;
   means fixed to the cylinder for mounting one end of the linkage rod;
   a resilient member positioned in the central bore;
   a snubber cap secured to the cylinder adjacent the open end, the snubber cap having a central opening with an inwardly-directed wall having axially opposed faces;
   a piston assembly slidably positioned in the central opening of the snubber cap and axially biased by said resilient member, the piston assembly being capable of limited axial movement relative to the snubber cap and the cylinder when the rod is placed in compression and in tension, the movement being limited in one direction by said piston assembly abutting one of said axially opposed faces and in the other direction by said piston assembly abutting the other one of said axially opposed faces of the inwardly-directed wall, to limit deflection of said resilient member caused by compression or extension of said rod so that when said piston assembly abuts either of said axially opposed faces, axial loads are transferred directly between said cylinder, snubber cap and piston assembly; and
   means fixed to said piston assembly for mounting the other end of said linkage rod.

2. The linkage rod of claim 1, wherein the piston assembly includes a snubber nut axially fixed to a mounting member, and the inwardly-directed wall is trapped between the mounting member and the snubber nut.

3. The linkage rod of claim 2, wherein the resilient member is formed from relatively fine strands of crimped wire and is loaded in compression to position the two ends of said linkage rod at a normal position relative to one another in which said piston assembly is biased against one of said axially opposed faces of said inwardly directed wall.

4. The linkage rod of claim 1, further comprising a spacer tube positioned in the central bore, the length of the spacer tube establishing the amount of compression of the resilient member prior to mounting the linkage rod.

5. The linkage rod of claim 1, wherein the inwardly-directed wall has snubber bushings mounted thereon.

6. The linkage rod of claim 1, further comprising a pair of load plates positioned in the central bore on opposite sides of the resilient member.

7. A linkage rod for absorbing shocks and vibrations, comprising an elongated cylinder having a central bore open at an open end of the cylinder; a resilient member positioned in the central bore; a snubber cap secured to the cylinder adjacent the open end, the snubber cap having a central opening with an inwardly-directed wall; a piston assembly slidably positioned in the central opening of the snubber cap, the piston assembly being capable of limited axial movement relative to the snubber cap and the cylinder, the movement of the piston assembly in one direction causing compression of the resilient member; and means for mounting the linkage rod,
   characterised in that
   the movement is limited in both directions by contact of the piston assembly with the inwardly-directed wall.

8. The linkage rod of claim 7, wherein the piston assembly includes a snubber nut axially fixed to a mounting member of the piston assembly, and the inwardly-directed wall is trapped between the mounting member and the snubber nut.

9. The linkage rod of claim 8, wherein:

the mounting member has a head portion adjacent a neck portion;

a nut engagement surface is formed between the head and neck portions; and the snubber nut is fastened to the head portion so that the snubber nut contacts the nut engagement surface.

10. The linkage rod of claim 7, wherein the resilient member is formed from relatively fine strands of crimped wire and is loaded in compression to position the two ends of said linkage rod at a normal position relative to one another in which said piston assembly is biased against one of two axially opposed faces of said inwardly directed wall.

11. The linkage rod of claim 7, further comprising a spacer tube positioned in the central bore, the length of the spacer tube establishing the amount of compression of the resilient member prior to mounting the linkage rod.

12. The linkage rod of claim 7, wherein the inwardly-directed wall has snubber bushings mounted thereon.

13. The linkage rod of claim 7, further comprising a pair of load plates positioned in the central bore on opposite sides of the resilient member.

* * * * *